US012582222B2

(12) United States Patent
Zavalloni

(10) Patent No.: US 12,582,222 B2
(45) Date of Patent: Mar. 24, 2026

(54) BRUSH FOR SONIC TOOTHBRUSH WITH LONGITUDINAL AXIS VIBRATION

(71) Applicant: Curaden AG, Kriens (CH)

(72) Inventor: Marco Zavalloni, Wohlen (CH)

(73) Assignee: Curaden AG (CH)

( * ) Notice: Subject to any disclaimer, the term of this patent is extended or adjusted under 35 U.S.C. 154(b) by 334 days.

(21) Appl. No.: 18/024,609

(22) PCT Filed: Sep. 14, 2022

(86) PCT No.: PCT/EP2022/075566
§ 371 (c)(1),
(2) Date: Mar. 3, 2023

(87) PCT Pub. No.: WO2023/041602
PCT Pub. Date: Mar. 23, 2023

(65) Prior Publication Data
US 2024/0277136 A1 Aug. 22, 2024

(30) Foreign Application Priority Data

Sep. 14, 2021 (EP) ..................................... 21196660
Sep. 14, 2021 (EP) ..................................... 21196661

(51) Int. Cl.
*A46B 5/00* (2006.01)
*A46B 9/04* (2006.01)
(Continued)

(52) U.S. Cl.
CPC ............ *A46B 5/002* (2013.01); *A46B 5/0095* (2013.01); *A46B 9/04* (2013.01); *A46B 13/023* (2013.01);
(Continued)

(58) Field of Classification Search
CPC ......... A46B 5/002; A46B 5/0095; A46B 9/04; A46B 13/023; A46B 15/0038; A46D 3/00;
(Continued)

(56) References Cited

U.S. PATENT DOCUMENTS 6,768,548 B2 7/2004 Lukas et al.
2006/0168744 A1 8/2006 Butler et al.
(Continued)

FOREIGN PATENT DOCUMENTS

DE 29913406 U1 11/1999
DE 102016011477 A1 3/2018
(Continued)

OTHER PUBLICATIONS

EP3352703 (B1) Machine Translation into English.
(Continued)

*Primary Examiner* — Andrew A Horton
(74) *Attorney, Agent, or Firm* — Lerner David LLP

(57) ABSTRACT

A brush for a sonic toothbrush with longitudinal axis vibration having an elongated base body has a frustoconical base portion with a drive adapter for rotation-fixed coupling to a sonic toothbrush drive with longitudinal axis vibration, and a head portion with a bristle support in which a plurality of bristles are anchored, and an elongated neck portion connecting the base portion and the head portion is disclosed. The base body forms a kink angle in that a geometric base portion longitudinal axis and a geometric head portion alignment axis include an angle γ in the range of 5° to 12°. A geometric kink position in the base body has a distance from an end face of the base portion of at least 50% of a total length of the base body.

20 Claims, 4 Drawing Sheets

(51) Int. Cl.

| | |
|---|---|
| *A46B 13/02* | (2006.01) |
| *A46B 15/00* | (2006.01) |
| *A46D 3/00* | (2006.01) |
| *A61C 17/22* | (2006.01) |
| *A61C 17/34* | (2006.01) |

(52) U.S. Cl.

CPC ............ *A46B 15/0038* (2013.01); *A46D 3/00* (2013.01); *A61C 17/222* (2013.01); *A61C 17/3481* (2013.01); *A61C 2204/005* (2013.01)

(58) Field of Classification Search

CPC .............. A61C 17/222; A61C 17/3481; A61C 2204/005

See application file for complete search history.

(56) References Cited

U.S. PATENT DOCUMENTS

| | | | |
|---|---|---|---|
| 2010/0281636 A1* | 11/2010 | Ortins | A46B 15/0006 15/4 |
| 2012/0291212 A1 | 11/2012 | Montagnino | |
| 2019/0117356 A1* | 4/2019 | Bärtschi | A45D 29/17 |

FOREIGN PATENT DOCUMENTS

| | | | |
|---|---|---|---|
| EP | 2454967 | A1 | 5/2012 |
| EP | 3 352 703 | A1 | 8/2018 |
| EP | 3352703 | B1 | 11/2021 |
| JP | S611738 | A | 1/1986 |
| JP | 2012161368 | A | 8/2012 |
| WO | WO2005046508 | A1 | 5/2005 |
| WO | WO2017050612 | A1 | 3/2017 |

OTHER PUBLICATIONS

JPS611738 (A) Machine Translation into English.
DE29913406 (U1) Machine Translation into English.
WO2005046508 (A1) Machine Translation into English.
WO2017050612A1 Machine Translation into English.
DE102016011477 (A1) Machine Translation into English.
European office action of Aug. 22, 2023.
Extended European Search Report including Written Opinion for Application No. 25157733.4 dated Mar. 10, 2025. 8 pages (see p. 2-3, categorizing the cited references).

* cited by examiner

BRUSH FOR SONIC TOOTHBRUSH WITH LONGITUDINAL AXIS VIBRATION

CROSS REFERENCE TO RELATED APPLICATIONS

This application is a national phase application of International Application No.: PCT/EP2022/075566, filed on Sep. 14, 2022, and further claims priority to European Patent Application EP21196660.1, filed Sep. 14, 2021 and European Patent Application EP21196661.9 filed on Sep. 14, 2021, the content of the aforementioned applications incorporated herein by reference.

BACKGROUND OF THE INVENTION

Field of the Invention

The invention relates generally to a brush for a sonic toothbrush with longitudinal axis vibration comprising an elongated base body having: a base portion with a drive adapter for rotation-fixed coupling to a sonic toothbrush drive having longitudinal axis vibration.

Description of Related Art

There are different types of electrically powered toothbrushes.

From the publications DE 10 2016 011477 (Schiffer), EP 2'454'967 A1 (Braun), WO 2005 046508 A1 (Trisa) and others, the principle of the round brush head is known, which can rotate around an axis parallel to the bristle direction and is moved back and forth around this axis. The advantage of this arrangement is that the moving part (namely the round brush head) is very small. It does not need much drive energy and occurring forces (torques) tend to be small. The disadvantage of this principle is that the bristle movement depends on the distance from the axis of rotation. The closer the bristles are to the axis of the brush head, the less back and forth movement there is. The movement pattern is therefore very inhomogeneously distributed over the bristle field.

The principle of pendulum motion is known from JP H04-43127 (Kao), US 2006 168744 A1 (Butler), US 2012/0291212 (Montagnino) and others. Here, the brush oscillates about a pendulum axis that is perpendicular to the hand apparatus (drive) and to the attached brush and that intersects the longitudinal extension axis of the hand apparatus and brush at the point where the brush is coupled to the hand apparatus. The advantage is that the intensity of movement is homogeneously distributed over the entire bristle field. This is because all bristles have more or less the same distance from the pendulum axis. The disadvantage, however, is that relatively large forces (moments) occur because the brush head with its mass is relatively far away from the pendulum axis.

The principle of housing vibration is known from JP 2012-161368 (Sanion), DE 299 13 406 U1 (Rowenta), U.S. Pat. No. 6,766,548 B1 (Rowenta), WO 2005 046508 A1 (Trisa), WO 2013/104020 A1 (Erskine) and others. A drive in the hand apparatus or in the brush neck generates an undefined vibration that is transmitted to the bristles. The advantage of this design is that one does not have to deal with the technical details of the motion transmission. The disadvantage, however, is that one has to vibrate the entire housing and that correspondingly more drive energy is required than if only a small part has to be vibrated. In addition, the vibration must not be too strong, because that would affect the comfort of holding the hand apparatus. Finally, the effective movements of the bristles are not known and the effect of cleaning this type of undefined and uncontrolled vibration is far from optimal.

Another principle is known from the publications WO 2012-151259 A1 (Water Pik), EP 2'548'531 B1 (Trisa) and others. Here, the hand apparatus has a coupling pin that rotates back and forth around the longitudinal axis. The brush mounted on the coupling pin has a straight neck and a bristle plate at the end, from which the bristles are transverse to the longitudinal axis of the hand apparatus or the brush neck. The advantage of this geometry is that relatively low forces (moments) occur because the mass (neck, bristle plate) of the mounted brush is relatively close to the longitudinal axis (center of motion). Also, the intensity of movement is relatively evenly distributed over the bristle field. The disadvantage of this principle, however, is that the bristles perform only a one-dimensional movement (back and forth). On the one hand, this results in an unsatisfactory foaming effect for the toothpaste and, on the other hand, the advantage of the circular and thus gentle and at the same time efficient movement, which has been taught as advantageous by specialists in connection with the manual toothbrush for decades, is missing.

For manual toothbrushes, it is known that the cleaning effect depends on the hardness of the bristles. Bristles of different hardness have different cleaning effects and different damage potential depending on the intended use. These effects are well known in professional circles and are also regularly included in the advice given to patients.

Sonic toothbrushes are very comfortable for the user and are also considered efficient because the electrically powered brush makes the movements much faster than can be done by hand.

In the case of sonic toothbrushes, it has been based on the fact that the higher the frequency of the motor and the greater the cleaning movement of the bristles, the better the cleaning.

WO 2017/050612 A1 (Curaden) describes a sonic toothbrush with an angled brush head. The fact that the sonic toothbrush is angled forwards makes the various areas of the dentition more accessible. In addition, the bend allows the filaments of the brushes to vibrate with greater amplitude transversely to the longitudinal axis of the brush. The preferred operating frequency is at 2000 to 8000 Hertz. However, the frequencies can also be higher for example at 10 kHz, 50 kHz or even lower, for example at 200 Hz or 500 Hz.

From US 2012/02912 A1 an ultrasonic toothbrush is known which has two parallel channels running transversely to the longitudinal axis of the brush to increase the resonant frequency. The frequency is increased in the forward-backward direction when the two channels are placed at the front. If the channels are provided on the left and right of the brush neck, the frequency is increased in the lateral direction.

There is still a lack of sufficient understanding of the cleaning behavior of sonic toothbrushes. The knowledge we have today regarding the cleaning effect of manual toothbrushes cannot be transferred to the highly dynamic situation of a sonic toothbrush.

BRIEF SUMMARY OF THE INVENTION

An object of the invention is to create a toothbrush for sonic toothbrushes which belongs to the technical field mentioned at the beginning and which has a better cleaning effect, in particular one which is gentle on the gums. In particular, a defined and controlled two-dimensional movement of the bristles is to be produced.

The brush for a sonic toothbrush with longitudinal axis vibration has an elongated base body that is a) a frustoconical base portion having a drive adapter for rotation-fixed coupling to a sonic tooth brush drive with longitudinal axis vibration, the drive adapter defining a geometric base portion longitudinal axis (x) of the brush, b) has a head portion with a head portion alignment axis and a bristle support in which a plurality of bristles are anchored, c) and having a neck portion with a tapered cross-section compared to the base portion, connecting the base portion and the head portion.

The base body has a kink angle such that a geometric base portion longitudinal axis and a geometric head portion alignment axis include an angle γ in the range of 5° to 12°. In addition, a geometric kink position in the base body has a distance from an end face of the base portion of at least 50% of a total length of the base body.

The sonic toothbrush according to the invention basically generates an oscillation of the brush about the longitudinal axis, i.e. the base portion longitudinal axis (which is defined here as the x-axis). The bristles thereby primarily perform a wiping motion transverse to said longitudinal axis. A particular advantage of the brush according to the invention is that it has a kink angle position which results in a sufficiently large deflection (also called eccentricity) of the head portion so that it also performs a certain oscillation in the direction of the longitudinal axis. The result is a two-dimensional movement, which can be called an "8" movement. Such a movement is particularly advantageous in several respects.

The combination of the special kink angle, which according to the invention is not too small and not too large, and the kink angle position according to the invention, which is not too close to the base portion, results in a deflection (or eccentricity with respect to the base portion longitudinal axis) and a leverage effect that results in a slight nodding movement of the brush head during operation of the toothbrush. This results in the above-mentioned two-dimensional "8" movement of the bristle tips.

However, it is an advantage of the present brush design that the brush also performs a small "nodding movement" in the direction of the bristles. This forces the mixture of saliva and toothpaste "forward" into the interdental spaces. This is particularly important for single-bristle toothbrushes, which are specially designed for better interdental cleaning.

The invention is also based on the following basic features:

a) The brush has a base portion on which an adapter to the hand apparatus, a so-called drive adapter, is formed. The adapter is geometrically designed to be non-rotatably (but replaceably) connected to a coupling part (e.g. pin) of the sonic tooth brush drive. The sonic toothbrush drive generates a longitudinal axis vibration to be transmitted to the brush. The drive adapter defines a geometric base portion longitudinal axis (x) of the brush. This longitudinal axis is normally the direction in which the brush can be placed on the hand apparatus.

b) Further, the brush has a head portion with a bristle support in which a plurality of bristles are anchored (bristle field). The head portion is in principle the upper end of the brush (whereas the base portion is the lower end). The head portion defines a head portion alignment axis. For example, the bristles anchored in the head portion project away at right angles to the head portion alignment axis. Typically, but not necessarily, the bristles are perpendicular to the head portion alignment axis.

c) Between the base portion and the head portion, the base body has a neck portion. The neck portion therefore connects the base portion and the head portion. It has a tapered cross-section compared to the base portion. This means that if you look at the base portion in cross-section (in relation to the longitudinal axis of the base portion), the dimensions in the x or y direction are smaller than for the cross-section of the neck portion (i.e. transverse to the longitudinal axis of the neck portion). Here, cross-sectional taper refers to the cross-sectional area. It is therefore not mandatory that the dimensions in the x-direction and y-direction are smaller.

In a first variant, the bristle support comprises a plurality of tufts, each with a plurality of bristles. In a second variant, the bristle support comprises exactly one tuft with a large number of bristles (single-tuft variant).

However, the bristles can also be indirectly anchored to the surface of the bristle support, particularly if the brush is designed as an interdental brush. In a third variant, the bristle support in comprises a wound or layed wire loop on its surface, with the bristles clamped between the strands. In this case, the head portion alignment axis is preferably aligned at right angles to the wire orientation.

The geometric kink position is defined by an intersection between the geometric base portion longitudinal axis and the geometric head portion alignment axis. At the geometric kink position, therefore, there does not necessarily have to be a kink-like (or knee-like) change in direction of the base body. Preferably, the geometric kink position is located within the base body. The shape of the base body does not necessarily have to comprise a visually recognizable kink, but can be curved, for example. In variants, the geometric kink position can also be located outside the base body. Further variations are known to the skilled person.

The distance between the end face of the base portion and the kink position is measured along the longitudinal axis of the base portion. Likewise, the total length of the base portion is measured along the longitudinal axis of the base portion.

According to the invention, the geometric kink position comprises a relatively large distance from the head portion in order to achieve a particularly optimum vibrational behavior for cleaning the teeth in connection with the angle γ (gamma) between the geometric base portion longitudinal axis and the geometric head portion alignment axis of 5° to 12°. The greater the angle selected, the greater the deflection of the head portion from the longitudinal axis of the base portion (eccentricity). Similarly, the eccentricity becomes greater as the kink position is moved further away from the head portion. However, it has been shown that the two parameters (kink position and angle) do not influence the vibrational behavior to the same extent and in the same way, so that with regard to the cleaning effect, an increase in the angle, for example, cannot be compensated directly by a smaller distance between the kink position and the head portion, since the 2-dimensional or 3-dimensional vibration pattern of the head portion reacts differently to the two parameters.

The distance between the geometric kink position and the end face of the base portion is preferably at least 60% of the total length of the base body. This defines a particularly optimal range for the geometric kink position, which according to the experiments leads to particularly advantageous 2-dimensional or 3-dimensional vibration patterns. In this way, particularly effective and at the same time gentle tooth cleaning can be achieved.

In variants, the distance of the geometric kink position to the end surface of the base portion can also be between 50% and 60% of the total length of the base portion.

According to a special embodiment, the distance between the geometric kink position and the end face of the base portion is at most 75% of the total length (L) of the base body. In this upwardly limited range, a sufficiently strong "8" movement can be achieved with the invention's kink angle of 5° to 12° with great design freedom with regard to the geometric dimensions of the neck portion and head portion.

According to a special embodiment, the head portion is plate-shaped and the neck portion is rod-shaped. Thus, the head portion is wider in cross-section (i.e., in the plane perpendicular to the head portion alignment axis) in one direction (e.g., y-direction) than in the other direction (e.g., z-direction). The shape of the cross-section can be, for example, rectangular, trapezoidal or oval.

For example, the neck portion is circular, oval, quadrangular, hexagonal, octagonal, trapezoidal, or a geometric approximation or variation of such a shape in cross-section. The cross-sectional shape need not be rotationally symmetrical.

According to a first particular embodiment, the head portion is at least about twice as wide as the neck portion.

According to a second particular embodiment, the head portion is at most about 1.5 times as long as the neck portion. This can also be combined with the previously mentioned embodiment.

According to a third particular embodiment, the head portion is approximately the same thickness as the neck portion in a cross-section spanned by the longitudinal axis of the brush and the head alignment axis. Thus, if the head portion is plate-shaped, then the neck portion is approximately the same thickness as the head portion plate.

In one embodiment, the head portion is at least about twice as wide and at most about 1.5 times as long as the neck portion. Particularly preferably, the head portion is between 2 and 3 times as wide and preferably between 0.5 and 1.5 times as long as the neck portion. With the relatively slim neck portion compared to the head portion, a particularly good vibrational behavior is achieved and thus optimum cleaning of the teeth is achieved.

In variants, the head portion can also be less than twice as wide and more than 1.5 times as long as the neck portion.

In a particular embodiment, the head portion has a mass that is greater than a mass of the neck portion, in particular the head portion has a mass that is preferably more than 30%, more preferably more than 50% greater than the mass of the neck portion. This mass distribution can be achieved either by appropriate geometric dimensions or by different materials or by both.

The relatively large mass of the head portion compared to the neck portion has the effect that a slightly nodding movement of the brush head (a movement in the z-direction) can be optimized during operation of the toothbrush. Due to the larger mass, the momentum of the nodding movement can be increased, which means that the two-dimensional "8" movement can be strengthened and, in turn, the interdental spaces can be better reached. This is especially, but not only, advantageous for the single tuft version or the interdental brush.

In variants, the head portion can also comprise a mass which is less than 30% larger than the mass of the neck portion, in particular the masses of the head portion and the neck portion can also be approximately the same. For example, if the head portion is the same thickness as the neck portion, and if the neck portion is three times as long as the head portion and the head portion is three times as wide as the neck portion.

Preferably, the base portion is about the same length as the head portion. This means that the base portion is sufficiently large to achieve a stable attachment to the sonic toothbrush drive (e.g. with a long adapter channel for a correspondingly long pin of the hand apparatus). The vibration and thus the kinetic energy of the drive will be efficiently transmitted to the head portion via the neck portion.

In a particular embodiment, the base portion is shorter than the head portion, in particular the base portion is about half as long as the head portion. This provides more design freedom for the neck section. Furthermore, if in such an embodiment the drive adapter is formed as a slim pin on the brush which is inserted into an adapter channel in the hand apparatus, then the stable attachment to the sonic toothbrush drive is hidden.

In variants, the base portion can also be longer than the head portion.

Preferably, the neck portion has a transverse dimension that is no more than one-quarter of a length of the neck portion. The transverse dimension is understood to be a diameter perpendicular to the geometric alignment axis or perpendicular to the longitudinal base portion axis. Where the neck portion adjoins the head portion, the head portion alignment axis is decisive and where the neck portion adjoins the base portion, the base portion longitudinal axis is decisive. The neck portion is thus deliberately kept slim so that the vibrational behavior of the head portion can be supported, in particular the vibrational behavior in the plane (the "8" movement) and the nodding movement.

In variations, the transverse dimension may be more than a quarter of a length of the neck portion. This can be useful if, for example, a particularly flexible or elastic material is used for the neck portion.

Preferably, the base body has a load-bearing material with a Young's modulus of less than 8,000 MPa. In particular, the Young's modulus is in a range from 2000 MPa to 6000 MPa. This results in a base body that is sufficiently elastic to optimally transmit the vibrations and is also sufficiently stable.

Preferably, the Young's modulus is at least 2500 MPa, in particular at least 3000 MPa. This ensures a base body which is sufficiently strong to optimally transmit the longitudinal axis vibrations.

In certain variants of the invention (e.g. for rather small kink angles in the range of 8°), the Young's modulus may tend to be lower (e.g. 2000 MPa to 3000 MPa) than for large kink angles (e.g. at 15°).

Another particular embodiment is characterized by the Young's modulus of the load-bearing material(s) of the base body being in the range of 4000 MPa to 6000 MPa.

If the mass of the head portion is relatively large in relation to the cross-section of the neck portion, then a Young's modulus in the range of 5000 MPa to 6000 MPa is advantageous.

Preferably, the base body consists essentially of one-piece of one material. On the one hand, this makes it possible to manufacture the base body particularly cost-effectively. On the other hand, it also enables particularly optimum vibrational behavior, since no boundary transitions of different materials interfere with the vibrational behavior, in particular a 2-dimensional or 3-dimensional vibrational behavior in which such a boundary transition is diffracted by the vibration pattern in different directions.

In the context of the invention, a one-piece base body of one material is also referred to when the surface of the brush is coated or sheathed by a non-supporting material. For example, in a one-piece base body, areas of a material with increased roughness or surface grip may be provided on the base portion so that the brush can be more easily removed from the drive pin by the fingers.

According to a particular embodiment, the base body is formed essentially by two parts of material bonded by a material bond. If, for example, the base portion is injection molded from a different plastic than the neck and head of the brush, then a very stiff plastic (with a high Young's modulus) can be used to ensure that the coupling to the drive pin on the hand apparatus optimally transmits the movement of the drive to the brush. Nevertheless, the neck can be made sufficiently elastic with a less stiff material (Young's modulus of the material of the neck portion is lower than Young's modulus of the base portion).

Another particular embodiment is characterized by the fact that the base body is essentially formed by three parts of material bonded by a material bond. For example, the base body can consist of two parts of material bonded by a material bond of different strength in the longitudinal direction. It is further conceivable that the head portion, neck portion and base portion are each formed from different materials. The requirements for the head portion are different from those for the base portion, which can be optimized with the choice of material.

A base body made of two or three materials bonded by a material bond is obtained, for example, by modern plastic injection molding processes with two or three materials.

Non-supporting (e.g. soft) shell layers may also be present on the base body with the two or three supporting parts of material in order to achieve certain functions (e.g. protection when the back of the brush comes into contact with the teeth).

Preferably, the head portion has a deflection of 10%-20% relative to a length of the brush. In the present case, the deflection is understood as a ratio between the distance of a center (center of gravity) of the head portion to the adapter longitudinal axis, divided by the total length L (in x-direction) of the base body. The deflection can be considered as "eccentricity of the head portion with respect to the adapter longitudinal axis". The deflection is decisive in the vibration pattern: it was found that with the deflection of 10%-20%, the "8" movement is particularly pronounced.

The deflection can also be less than 10% or greater than 20%. For brushes that have an overall short length, the deflection is preferably selected in the range of 20% so that the "unbalance" of the head does not become too small. For brushes intended for high operating frequencies (e.g. above 240 Hz), the deflection is selected rather in the range of 10%, because at higher frequencies the "unbalance" of the head could otherwise become too large.

According to a particular embodiment, the bristles project substantially perpendicularly away from the head portion alignment axis of the brush. The angle between the base portion longitudinal axis and the bristle direction is then 90° minus the kink angle γ (gamma). For example, if the kink angle is γ=9°, the result is 90°−9°=81°.

The bristles are anchored, for example, on the main surface of the plate-shaped head portion. However, in the case of a single tuft brush, the head portion may also be rod-shaped, with the single tuft anchored in a cylindrical recess (e.g., a blind hole).

Preferably, a geometric base portion longitudinal axis and a geometric head portion alignment axis enclose an angle γ (gamma) in the range of 7° to 10°. This angular range has been shown to be particularly advantageous in experiments, so that a particularly ideal vibration pattern can be achieved with it for tooth cleaning. Experiments have shown that the vibration pattern, in particular the "8" movement, is particularly advantageous, which means that tooth cleaning with the brush can be performed particularly gently. The angle range has also proven to be particularly advantageous in connection with the deflection or eccentricity of the head portion in relation to the overall length of the brush between 10% and 20% and has also led to particularly good cleaning results with optimum ergonomics.

The angular range of 7°-10° in combination with a deflection of 10% to 20% leads to good self-dynamics of the vibration of the brush head in the sense of the desired "8-movement".

In a particular embodiment, the neck portion is cross-sectionally tapered compared to the head portion. That is, the head portion is wider and/or thicker (as viewed perpendicular to the head portion alignment axis) than the neck portion. This makes the neck portion mechanically less rigid than the head portion (provided that the base body is made of one or more materials having approximately the same Young's modulus).

A sonic toothbrush with longitudinal axis vibration according to the invention comprises a brush according to the invention and a hand apparatus with a brush coupling for releasably attaching the brush to the hand apparatus and with a drive generating a longitudinal axis vibration at the brush coupling. The drive may comprise, for example, a piezo drive, a magnetic drive and/or an electro-rotary drive. A piezo drive is particularly preferred, especially because of its simple design, particularly compact construction and precise controllability.

Preferably, the drive is designed to generate a longitudinal axis vibration frequency in the range of 150 Hz to 400 Hz. Since a 2-dimensional or 3-dimensional motion pattern is generated with the brush, the longitudinal axis vibration frequency is set relatively low so that more time is available for carrying out several directional changes per vibration, e.g. in an "8" motion. The longitudinal axis vibration frequency is advantageously not higher than 300 Hz. If the frequency is too high, the base body can no longer transmit the longitudinal axis vibration generated by the drive to the brush head. This can lead to internal torsional movements which cause the head to perform only every second vibration, for example.

The longitudinal axis vibration frequency can also be less than 150 Hz, e.g. 120 Hz.

Preferably, the drive is designed to generate a longitudinal axis vibration with an amplitude (deflection relative to a rest position) of less than 3°, in particular in the range of 1° to 3°. That is, the base portion is periodically rotated (moved back and forth) through the angle about the base portion longitudinal axis. In variations, the amplitude may be greater than 3°.

The brush for a sonic toothbrush with longitudinal axis vibration has an elongated base body which has a) a base portion having a drive adapter for rotation-fixed coupling to a sonic toothbrush drive with longitudinal axis vibration, the drive adapter defining a geometric base portion longitudinal axis (x) of the brush, b) a head portion with a head portion alignment axis and a bristle support in which a plurality of bristles are anchored, c) and a neck portion which is tapered in cross-section relative to the base portion and which connects the base portion and the head portion.

The base body of the brush has a kink angle in that the geometric base portion longitudinal axis and a geometric head portion alignment axis include an angle γ (gamma) in the range of 8° to 15°. As a second important feature, the base body comprises a load-bearing material having a Young's modulus of not more than 6000 MPa and not less than 2000 MPa (MPa=megapascale).

The sonic toothbrush according to the invention basically generates a vibration of the brush about the longitudinal axis, i.e. about the base portion longitudinal axis (which is defined here as the x-axis). The bristles thereby primarily perform a wiping motion transverse to said longitudinal axis (which is defined here as the y-axis). A particular advantage of the brush according to the invention is that it has a certain elasticity due to the selected material parameter and therefore also performs a vibration in the direction of the longitudinal movement (x-axis) at the intended vibration frequency. This results in a movement that can be described as an "8" movement. The bristles are moved synchronously in the x and y directions and follow a line in the shape of an "8". Such a movement is particularly advantageous for dental care in several respects.

The combination of a sufficiently large kink angle of at least 8 and a Young's modulus that provides a sufficient (but not too great) degree of flexibility results in a two-dimensional movement of the head. This movement at the anchored end of the bristles controls the movement of the bristles at their cleaning end (free end of the bristles). The upper limit of the kink angle and the lower limit of the Young's modulus ensure that the brush head is still held sufficiently stable so that the undesirable "striking" movement (in the longitudinal direction of the bristles—i.e. in the direction of the z-axis) does not occur to an excessive (damaging) extent.

However, it is definitely an advantage of the present brush design that the brush performs a small "nodding movement" in the direction of the bristles (defined here as the z-direction), because this forces the mixture of saliva and toothpaste quasi "forward" into the interdental spaces. This is particularly important in the case of single-bristle toothbrushes, which are especially suitable for improved interdental cleaning.

Furthermore, the invention is based on the following basic features:

d) The brush has a base portion on which an adapter to the hand apparatus, a so-called drive adapter, is formed. The adapter is geometrically designed to be non-rotatably (but replaceably) connected to a coupling part (e.g. pin) of the sonic tooth brush drive. The sonic tooth brush drive generates a longitudinal axis vibration to be transmitted to the brush. The drive adapter defines a geometric base portion longitudinal axis (x) of the brush. This longitudinal axis is normally the direction in which the brush can be placed on the hand apparatus.

e) Further, the brush has a head portion with a bristle support in which a plurality of bristles are anchored (bristle field). The head portion is in principle the upper end of the brush (whereas the base portion is the lower end). The head portion defines a head portion alignment axis. For example, the bristles anchored in the head portion project away at right angles to the head portion alignment axis. Typically, but not necessarily, the bristles are perpendicular to the head portion alignment axis.

f) Between the base portion and the head portion, the base body has a neck portion. The neck portion therefore connects the base portion and the head portion. It has a tapered cross-section compared to the base portion. This means that if you look at the base portion in cross-section (relative to the longitudinal axis of the base portion), the dimensions in the x- or y-direction are smaller than for the cross-section of the neck portion (i.e. transverse to the longitudinal axis of the neck portion). Here, cross-sectional taper refers to the cross-sectional area. It is therefore not mandatory that the dimensions in the x-direction and y-direction are smaller.

Preferably, the Young's modulus is at least 2500 MPa, in particular at least 3000 MPa. This ensures a base body which is sufficiently strong to optimally transmit the longitudinal axis vibrations.

In certain variants of the invention (e.g. for rather small kink angles in the range of 8°), the Young's modulus may tend to be lower (e.g. 2000 MPa to 3000 MPa) than for large kink angles (e.g. at 15°).

Another particular embodiment is characterized by the Young's modulus of the load-bearing material(s) of the base body being in the range of 4000 MPa to 6000 MPa.

If the mass of the head portion is relatively large in relation to the cross-section of the neck portion, then a Young's modulus in the range of 5000 MPa to 6000 MPa is advantageous.

According to a particular embodiment, the neck portion is curved longitudinally to create the angle between the longitudinal base portion axis and the head portion alignment axis. In other words, the base portion and head portion are straight in themselves. Only the neck portion is curved. This has the advantage that the forces occurring during longitudinal axis vibration are distributed over the neck portion and are not concentrated at one point.

According to a particular embodiment, the neck portion is a slender section of the base body between the head portion and the foot portion. The base portion typically has the largest cross-section at the drive adapter (foot end) and the smallest cross-section at the transition to the neck portion.

The head portion is essentially defined by the fact that it forms the anchorage for the bristles.

Preferably, the head portion is plate-shaped and the neck portion is rod-shaped. Thus, the head portion is wider in cross-section (i.e., in the plane perpendicular to the head portion alignment axis) in one direction (e.g., y-direction) than in the other direction (e.g., z-direction). The shape of the cross-section may be rectangular, trapezoidal, or oval, for example.

For example, the neck portion is circular, oval, quadrangular, hexagonal, octagonal, trapezoidal, or a geometric approximation or variation of such a shape in cross-section. The cross-sectional shape need not be rotationally symmetrical.

According to a first particular embodiment, the head portion is at least about twice as wide as the neck portion.

According to a second particular embodiment, the head portion is at most about 1.5 times as long as the neck portion. This can also be combined with the previously mentioned embodiment.

According to a third particular embodiment, the head portion is approximately the same thickness as the neck portion in a cross-section spanned by the longitudinal axis of the brush and the head alignment axis.

Particularly preferably, the head portion is between 2 and 3 times as wide and preferably between 0.5 and 1.5 times as long as the neck portion. With the relatively slim neck portion compared to the head portion, a particularly good vibrational behavior is achieved and thus optimum cleaning of the teeth is achieved.

According to the above dimensioning, the head portion thus forms a kind of flywheel mass and the neck portion a kind of (slim) elastic rod.

In variants, the head portion can also be less than twice as wide and more than 1.5 times as long as the neck portion.

According to a preferred embodiment, the head portion is approximately the same thickness as the neck portion in a cross-section spanned by the longitudinal axis (x) and the head orientation axis. Thus, if the head portion is plate-shaped, then the neck portion is somewhat equal in thickness to the head portion plate.

In a particular embodiment, the head portion has a mass (i.e., inertial mass) that is greater than a mass of the neck portion, in particular, the head portion has a mass that is preferably greater than 30%, more preferably greater than 50% greater than the mass of the neck portion. This mass distribution can be achieved either by appropriate geometric dimensions or by different materials, or by both.

The relatively large mass of the head portion compared to the neck portion has the effect of optimizing a nodding motion of the brush head during operation of the toothbrush. The greater mass allows the momentum of the nodding movement to be increased, which in turn allows the two-dimensional "8" movement to be enhanced, which in turn allows the interdental spaces to be reached more effectively. This is a great advantage, especially, but not only, for the single-tuft variant or for interdental cleaning.

In one variant, the head portion can also comprise a mass that is less than 30% larger than the mass of the neck portion, in particular the masses of the head portion and the neck portion can also be approximately the same. For example, if the head portion is the same thickness as the neck portion, and if the neck portion is three times as long as the head portion and the head portion is three times as wide as the neck portion.

Preferably, the base portion is about the same length as the head portion. Thus, the base portion is sufficiently large to achieve a stable attachment to the sonic toothbrush drive (e.g., with a long adapter channel for a correspondingly long pin of the hand apparatus). The vibration and thus the kinetic energy of the drive will be efficiently transmitted to the head portion via the neck portion.

In a particular embodiment, the base portion is shorter than the head portion, in particular the base portion is about half as long as the head portion. This provides more design freedom for the neck portion. Furthermore, if in such an embodiment the drive adapter is formed as a slim pin on the brush which is inserted into an adapter channel in the hand apparatus, then the stable attachment to the sonic toothbrush drive is hidden.

In variants, the base portion can also be longer than the head portion.

Preferably, the neck portion has a transverse dimension that is no more than one-quarter of a length of the neck portion. The transverse dimension is understood to be a diameter perpendicular to the geometric alignment axis or perpendicular to the longitudinal base portion axis. Where the neck portion adjoins the head portion, the head portion alignment axis is decisive and where the neck portion adjoins the base portion, the base portion longitudinal axis is decisive. The neck portion is thus deliberately kept slim so that the vibrational behavior of the head portion can be supported, in particular the vibrational behavior in the plane (the "8" movement) and the nodding movement.

In variations, the transverse dimension may be more than a quarter of a length of the neck portion. This can be useful if, for example, a particularly flexible or elastic material is used for the neck portion.

Preferably, the base body is essentially a one-piece of one material. On the one hand, this achieves a particularly cost-effective production of the basic body. On the other hand, it also enables particularly optimal vibrational behavior, since no boundary transitions of different materials disturb the vibration behavior, in particular a 2-dimensional or 3-dimensional vibration behavior, in which such a boundary transition is diffracted by the vibration pattern in different directions.

In the context of the invention, a one-piece base body of one material is also referred to when the surface of the brush is coated or sheathed by a non-supporting material. For example, in a one-piece base body, areas of a material with increased roughness or surface grip may be provided on the base portion so that the brush can be more easily removed from the drive pin by the fingers.

According to a particular embodiment, the base body is formed essentially by two parts of material bonded by a material bond. If, for example, the base portion is injection molded from a different plastic than the neck and head of the brush, then a very stiff plastic (with a high Young's modulus) can be used to ensure that the coupling to the drive pin on the hand apparatus optimally transmits the movement of the drive to the brush. Nevertheless, the neck can be made sufficiently elastic with a less stiff material (Young's modulus of the material of the neck portion is lower than Young's modulus of the base portion).

Another particular embodiment is characterized by the fact that the base body is essentially formed by three supporting parts of material bonded by a material bond. For example, the base body can consist longitudinally of two parts of material bonded by a material bond of different strength. It is further conceivable that the head portion, neck portion and base portion are each formed from different materials. The requirements for the head portion are different from those for the base portion, which can be optimized with the choice of material.

A base body consisting of two or three load-bearing materials bonded by a material bond is obtained, for example, by modern plastic injection molding processes with two or three materials.

Non-supporting (e.g. soft) shell layers may also be present on the base body with the two or three supporting parts of material in order to achieve certain functions (e.g. protection when the back of the brush comes into contact with the teeth).

Preferably, the head portion has a deflection of 10%-20% relative to a length of the brush. In the present case, the deflection is understood as a ratio between the distance of a center (center of gravity) of the head portion to the adapter longitudinal axis, divided by the total length L (in x-direction) of the base body. The deflection can be considered as "eccentricity of the head portion with respect to the adapter longitudinal axis". The deflection is decisive in the vibration pattern: it was found that with the deflection of 10%-20%, the "8" movement is particularly pronounced.

The deflection can also be less than 10% or greater than 20%. For brushes that have an overall short length, the deflection is preferably selected in the range of 20% so that the "unbalance" of the head does not become too small. For brushes intended for high operating frequencies (e.g. above 240 Hz), the deflection is selected rather in the range of 10%, because at higher frequencies the "unbalance" of the head could otherwise become too large.

According to a particular embodiment, the bristles project substantially perpendicularly away from the head portion alignment axis of the brush. The angle between the base portion longitudinal axis and the bristle direction is then 90° minus the kink angle γ (gamma). For example, if the kink angle is γ=11°, the result is 90°−11°=79°.

The bristles are anchored, for example, on the main surface of the plate-shaped head portion. However, the head portion can also be rod-shaped in a single tuft brush, with the single tuft anchored in a cylindrical recess (e.g., a blind hole).

The distance of the geometric kink position to the end face of the base portion is preferably at least 50% of a length of the base body. Thus, in connection with the range of the Young's modulus according to the invention, a particularly optimal range is defined for the geometric kink position, which according to the experiments leads to particularly advantageous 2-dimensional or 3-dimensional vibration patterns. This makes it possible to achieve particularly effective and gentle tooth cleaning.

The geometric kink position is defined by an intersection between the geometric base portion longitudinal axis and the geometric head portion alignment axis. Thus, at the geometric kink position, there does not necessarily have to be a kink-like (or knee-like) change in direction of the base body. Preferably, the geometric kink position is located within the base body. The shape of the base body does not necessarily have to comprise a visually recognizable kink, but can be curved, for example. In variants, the geometric kink position can also lie outside the base body. Further variations are known to the skilled person.

The distance between the end face of the base portion and the kink position is measured along the longitudinal axis of the base portion. The total length of the base portion is also measured along the longitudinal axis of the base portion.

According to the invention, the geometric kink position comprises a relatively large distance from the head portion in order to achieve a particularly good vibrational behavior for cleaning the teeth in connection with the angle γ (gamma) between the geometric base portion longitudinal axis and the geometric head portion alignment axis of 8° to 15°. The greater the angle selected, the greater the deflection of the head portion from the longitudinal axis of the base portion (eccentricity). Similarly, the eccentricity becomes greater as the kink position is moved further away from the head portion. However, it has been shown that the two parameters (kink position and angle) do not influence the vibrational behavior to the same extent and in the same way, so that with regard to the cleaning effect, for example, an increase in the angle cannot be compensated directly by a smaller distance between the kink position and the head portion, since the 2-dimensional or 3-dimensional vibration pattern of the head portion reacts differently to the two parameters.

In variants, the distance of the geometric kink position to the end face of the base portion can also be less than 50% of a length of the base body, e.g. at least 35%.

Preferably, a geometric base portion longitudinal axis and a geometric head portion alignment axis include an angle γ (gamma) in the range of 10° to 14°. This angular range has proved to be particularly advantageous in experiments, so that a particularly ideal vibration pattern can thus be achieved for tooth cleaning. Experiments have shown that the vibration pattern, in particular the "8" movement, is particularly advantageous, which means that tooth cleaning with the brush can be performed particularly gently. The angle range has also proven to be particularly advantageous in connection with the deflection or eccentricity of the head portion in relation to the overall length of the brush between 10% and 20% and has also led to particularly good cleaning results with optimum ergonomics.

The angle range of 10°-14° in combination with a kink position at half the length of the brush leads to a good deflection (eccentricity) of the brush head. This results in good self-dynamics of the vibration of the brush head in the sense of the desired "8" movement.

In a particular embodiment, the neck portion is cross-sectionally tapered compared to the head portion. That is, the head portion is wider and/or thicker (as viewed perpendicular to the head portion alignment axis) than the neck portion. This makes the neck portion mechanically less rigid than the head portion (provided that the base body is made of one or more materials with approximately the same Young's modulus).

In a further embodiment of the invention, the distance (K) between the geometric kink position and the end face of the base portion is at least 60% of the total length (L) of the base body.

According to a special embodiment, the distance of the geometric kink position to the end surface of the base portion is at most 75% of the total length (L) of the base body. In this upwardly limited range, a sufficiently strong "8" movement can be achieved with the kink angle of 8° to 15° according to the invention with great design freedom with regard to the geometric dimensions of the neck portion and head portion.

A sonic toothbrush with longitudinal axis vibration according to the invention comprises a brush according to the invention and a hand apparatus with a brush coupling for releasably attaching the brush to the hand apparatus and with a drive which generates a longitudinal axis vibration at the brush coupling. The drive may comprise, for example, a piezo drive, a magnetic drive and/or an electro-rotary drive. A piezo drive is particularly preferred, especially because of its simple design, particularly compact construction and precise controllability.

Preferably, the drive is designed to generate a longitudinal axis vibration frequency in the range of 150 Hz to 400 Hz. Since a 2-dimensional or 3-dimensional motion pattern is generated with the brush, the longitudinal axis vibration frequency is set relatively low so that more time is available for carrying out several directional changes per vibration, e.g. in an "8" motion. The longitudinal axis vibration frequency is advantageously not higher than 300 Hz. If the frequency is too high, the base body can no longer transmit the longitudinal axis vibration generated by the drive to the brush head. This can lead to internal torsional movements which cause the head to perform only every second vibration, for example.

The longitudinal axis vibration frequency can also be less than 150 Hz, e.g. 120 Hz.

Preferably, the drive is designed to generate a longitudinal axis vibration with an amplitude of no more than 3°, in particular in the range of 1° to 3°. That is, the base portion is periodically rotated (moved back and forth) about the base portion longitudinal axis. In variants, the amplitude can also be greater than 3°.

In a particular embodiment of the invention, the brush in the base portion includes an RFID chip. This allows the hand apparatus to read and use data for optimal operation of the brush. For example, the optimum drive frequency of the brush can be read out and the drive in the hand apparatus can be controlled accordingly.

In another particular embodiment of the invention, the RFID chip is arranged in a longitudinal region of a coupling cavity of the base portion. This means that the RFID chip is arranged close to the hand apparatus and that the vibrational behavior of the brush is not affected.

From the following detailed description and the totality of the patent claims, further advantageous embodiments and combinations of features of the invention will be apparent.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure.

An advantageous embodiment of the present invention is set out below with reference to the accompanying figures, wherein.

The figures are merely schematic representations and serve only to explain the invention. Identical or similarly acting elements are marked throughout with the same reference signs.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figures 1, 2, 3:
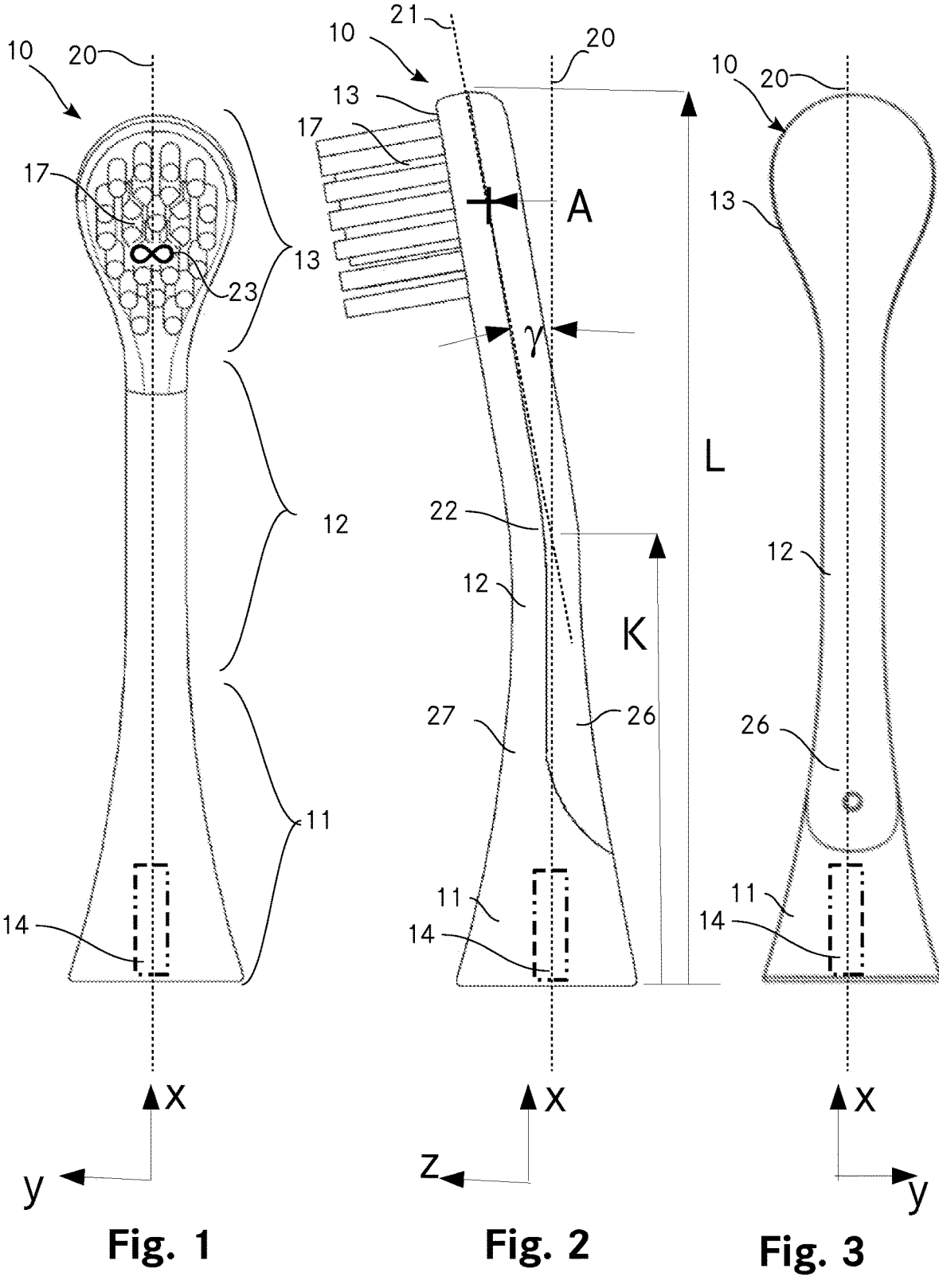
FIG. 1 depicts a schematic representation of a top view of a brush.
FIG. 2 depicts a schematic representation of a side view of the brush.
FIG. 3 depicts a schematic representation of a back view of the brush.

FIG. 1 shows a schematic representation of a top view of a brush 10. The brush 10 comprises a frustoconical base portion 11, a rod-shaped neck portion 12 adjoining the frustoconical base portion 11, and finally a plate-shaped head portion 13 adjoining the neck portion 12. The three parts form the base body of the brush.

The frustoconical base portion 11 comprises a drive adapter. This is formed essentially by a channel-shaped receptacle 14, into which a pin of the hand apparatus of the sonic toothbrush can be inserted and latched (see below for FIG. 4). The brush 10 comprises a base portion longitudinal axis 20, which is aligned coaxially with the receptacle 14 or, in operation of the sonic toothbrush, coaxially with the pin. This longitudinal axis defines the x-axis of the x-y-z coordinate system used here. In other words, the drive adapter defines the geometric base portion longitudinal axis (x) of the brush.

FIG. 1 further shows the bristle field 17 of the head portion 13, which comprises several (e.g. 20-40) tufts, each with a plurality (e.g. 100-200) of bristles.

According to a preferred embodiment, the head portion 13 is drop-shaped in the front view. This means that its shape widens successively-starting at the transition to the neck portion—almost to the upper end of the head portion, where it ends in a rounded final contour. With this shape (for a given length of the bristle field in the x-direction), the center of gravity of the head portion 13 is closer to the end of the brush. This can increase the eccentric effect at the given operating frequency and thus also the "8" movement.

The main surface of the plate-shaped head portion 13 extends essentially transversely along the x-axis in the y-direction.

On the bristle field 17, a "8" lying in the y-direction is further shown with the reference sign 23. The "8" illustrates the movement that is performed in the plane due to the selected material property (Young's modulus), the angle between the geometric base portion longitudinal axis and the geometric head portion alignment axis (see further below), and the kink position during operation.

In addition to the "8", the brush also performs a small nodding movement with the head portion 13—this movement is directed substantially perpendicular to the "8", that is, substantially in the z-direction. In the sense of a preferred embodiment, the bristles are thus moved in three dimensions (x, y, z).

FIG. 2 shows a schematic representation of a side view of the brush 10. In this figure, in addition to the geometric base portion longitudinal axis 20, the geometric head portion alignment axis 21 is also apparent. In the representation shown in FIG. 1, the base portion longitudinal axis 20 and the head portion alignment axis 21 are one behind the other. The head portion alignment axis 21 is essentially the longitudinal axis of the head portion. The two axes intersect at the geometric kink position 22. In the present embodiment, the geometric base portion longitudinal axis 20 and the geometric head portion alignment axis 21 enclose an angle γ (gamma) of 10°. In the present embodiment, the geometric kink position 22 comprises a distance K from the end face of the base portion 11 of 50% of the total length L of the brush 10. In this combination of the angle to the kink position 22, a brush 10 is created with which a particularly effective and gum-sparing cleaning of the teeth is possible.

As can be seen from the combination of FIGS. 1 and 2, in the present embodiment the head portion 13 is plate-shaped and the neck portion 12 is rod-shaped. In the projection of the base body onto the x-z plane, the head portion 13 and the neck portion 12 have the same transverse dimension (i.e., the same thickness). In the projection onto the x-y plane (front view according to FIG. 1), the head portion 13 is about three times as wide (y-direction) as the neck portion 12. The length (x-direction) of the head portion is about one third greater than the width (y-direction). The neck portion 11 is, for example, one third as wide and 1.5 times as long as the head portion 13.

The neck portion 12 is tapered relative to the head portion 13 and the base portion 11. In the present example, the neck portion 12 is less wide than the head portion 13 in at least one of the side views (viewed here in the z-direction according to FIG. 1).

In the present example, the base body of the brush 10 has as load-bearing material a glass fiber-reinforced polypropylene Borealis GB311U with a Young's modulus of about 3500 MPA (Tensile Strength at Yield=97 MPa; Elongation at Yield=2.8%; Young's modulus=Tensile Strength at Yield/ Elongation at Yield).

The deflection is determined by the ratio of distance A to length L of the brush. The distance A corresponds to the distance from the front center of the head portion (which in this case corresponds to the center of the bristle field 17) to the longitudinal axis 20 of the base portion (see FIG. 2). In the present example, the deflection is 14%.

Here, the bristles are arranged in several tufts and project perpendicularly away from the main surface of the plate-shaped head portion. In the present case, they are perpendicular to the y-direction and extend in the x-z plane. In the present embodiment, the bristles are attached to the front of the head portion (or front 27 of the brush), i.e., they point slightly downward toward the adapter surface (y-z plane) of the base portion.

FIG. 3 shows a schematic representation of a back view of the brush 10 according to FIGS. 1 and 2. As can be seen from the figures, the base body has a different material on the back 26, which is soft and provides protection (protective coating, protective sheath) when the back of the brush comes into contact with the teeth. This material is non-supporting and can therefore have a Young's modulus outside the Young's modulus range of 2000-6000 MPa according to the invention. The load bearing material is evident on the front face 27 and it makes up a substantial portion of the cross section of the base body.

Figures 4, 5A, 5B, 6, 7, 8:
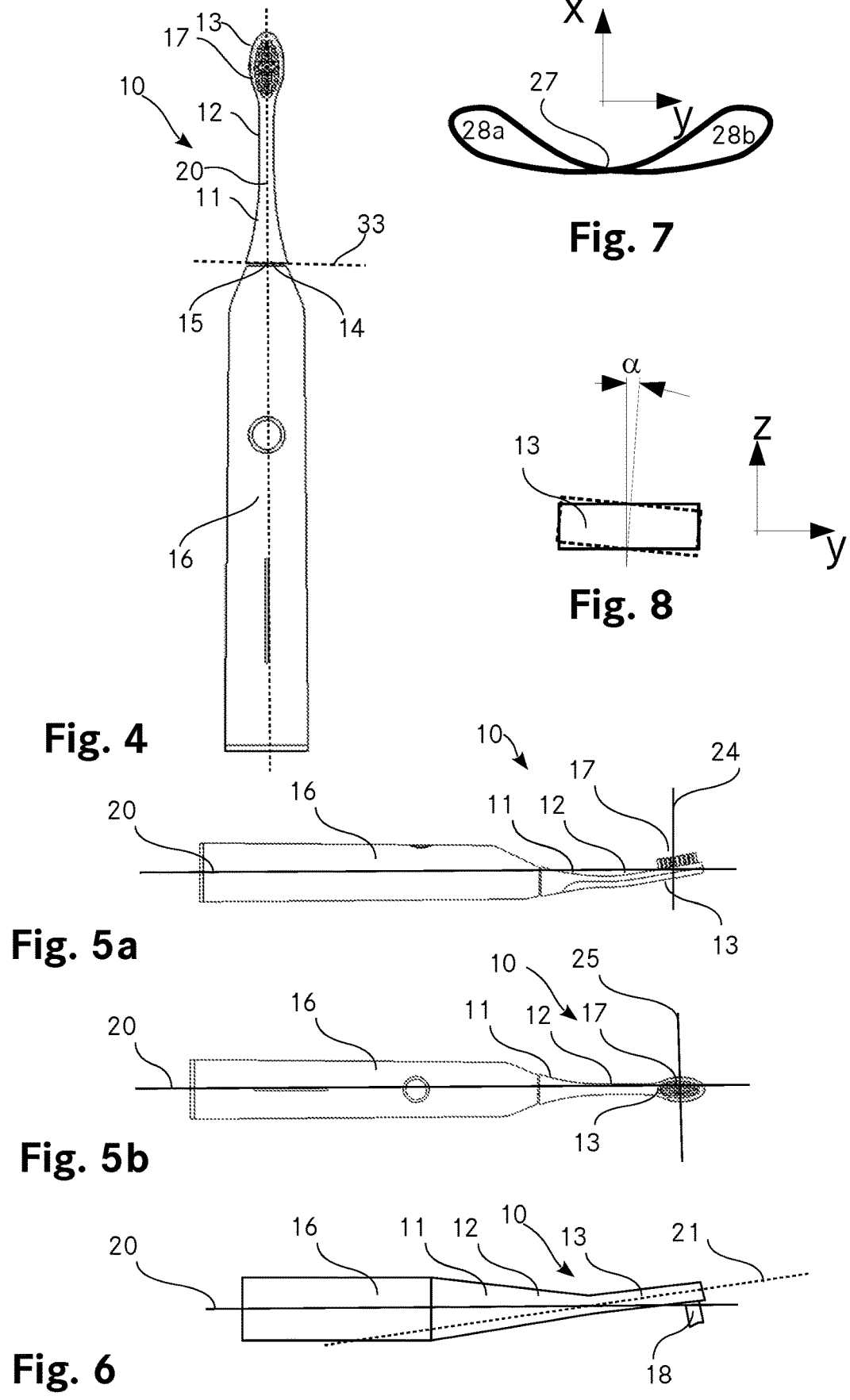
FIG. 4 depicts a schematic representation of a top view of a sonic toothbrush comprising the brush.
FIGS. 5*a* and 5*b* depict a schematic side view and a top view of a sonic toothbrush.
FIG. 6 depicts a schematic representation of a side view of a sonic toothbrush with exactly one tuft.
FIG. 7 depicts a schematic representation of the "8" movement according to the invention.
FIG. 8 depicts a schematic representation of the angular amplitude of the longitudinal axis vibration.

FIG. 4 shows a schematic representation of a top view (z-direction) of a sonic toothbrush comprising the brush 10 and a hand apparatus 16 with a pin 15. The brush 10 is mounted on the pin 15 so that the brush is releasable, rotationally fixed and axially fixed. At the transition between the brush 10 and the hand apparatus 16, the adapter plane 33 is defined. It is perpendicular to the longitudinal axis of the hand apparatus and the longitudinal axis of the base portion of the brush. The hand apparatus 16 rotates the pin 15 back and forth at a frequency of, for example, 180-270 Hz with an amplitude of, for example, 2° (relative to a rest position) about the longitudinal axis of the pin 15 (which corresponds to the longitudinal axis of the hand apparatus 16). The brush thus rotates back and forth around the base portion longitudinal axis 20 (x-axis).

FIG. 5a shows a schematic diagram of a side view of a sonic toothbrush 10. The sonic toothbrush 10 comprises a hand apparatus 16 and a brush 10. The drive of the hand apparatus 16 is designed as a piezoelectric drive (not shown), which generates a vibration of the brush about the x-axis 20 (longitudinal axis of the hand apparatus). Thus, the brush 10 performs a rotational oscillation about the x-axis 20 relative to the handle during operation. Due to the deflection of the head portion 13 in accordance with the invention, an unbalance is created which supports a component of motion in the Y-direction 24 and/or in the Z-direction 25 (see below, FIG. 5b). This effect is controlled by the suitably angled bend in the brush neck, the suitably selected Young's modulus, and can be adjusted by other geometric design features of the brush (such as bend angle position, deflection, mass distribution and other features according to particular embodiments of the invention).

FIG. 5b shows a schematic top view of a personal care device according to FIG. 5a. In this representation, the Z-direction 25 is apparent. It runs essentially in the direction of the bristles. As can be seen from the figure, the hand apparatus is significantly larger than the brush. Only in this way can it generate a longitudinal axis vibration (instead of an undefined or undirected vibratory movement, as is the case with known sonic toothbrushes).

FIG. 6 shows an embodiment of the sonic toothbrush which comprises exactly one tuft 18. The tuft 18 is arranged at the rear with respect to the head portion 13. The head portion is inclined quasi backwards.

FIG. 7 shows a schematic representation of the "8" movement according to the invention. The "8" movement comprises the shape of a "8" flattened on one side, with an axis of symmetry (X axis) running through center 27 of the "8". The two loops 28a, 28b of the "8" extend in the y-direction. However, the invention is not limited to exactly this shape of the "8" motion, the exact shape of the motion ultimately depends on the parameters of the brush head as well as the vibration generated by the motor of the hand apparatus.

FIG. 8 illustrates the amplitude of the longitudinal axis oscillation movement. The x-axis is perpendicular to the drawing plane. The plate-shaped head portion 13 (shown without bristles) pivots about the x-axis by the angle α (alpha). (The bristles extend upward in the z-direction in FIG. 8). The main component of the pivoting motion (and thus the bristle wiping motion) is in the y-direction. The angle α (alpha) is preferably 2°.

Figures 9, 10, 11:
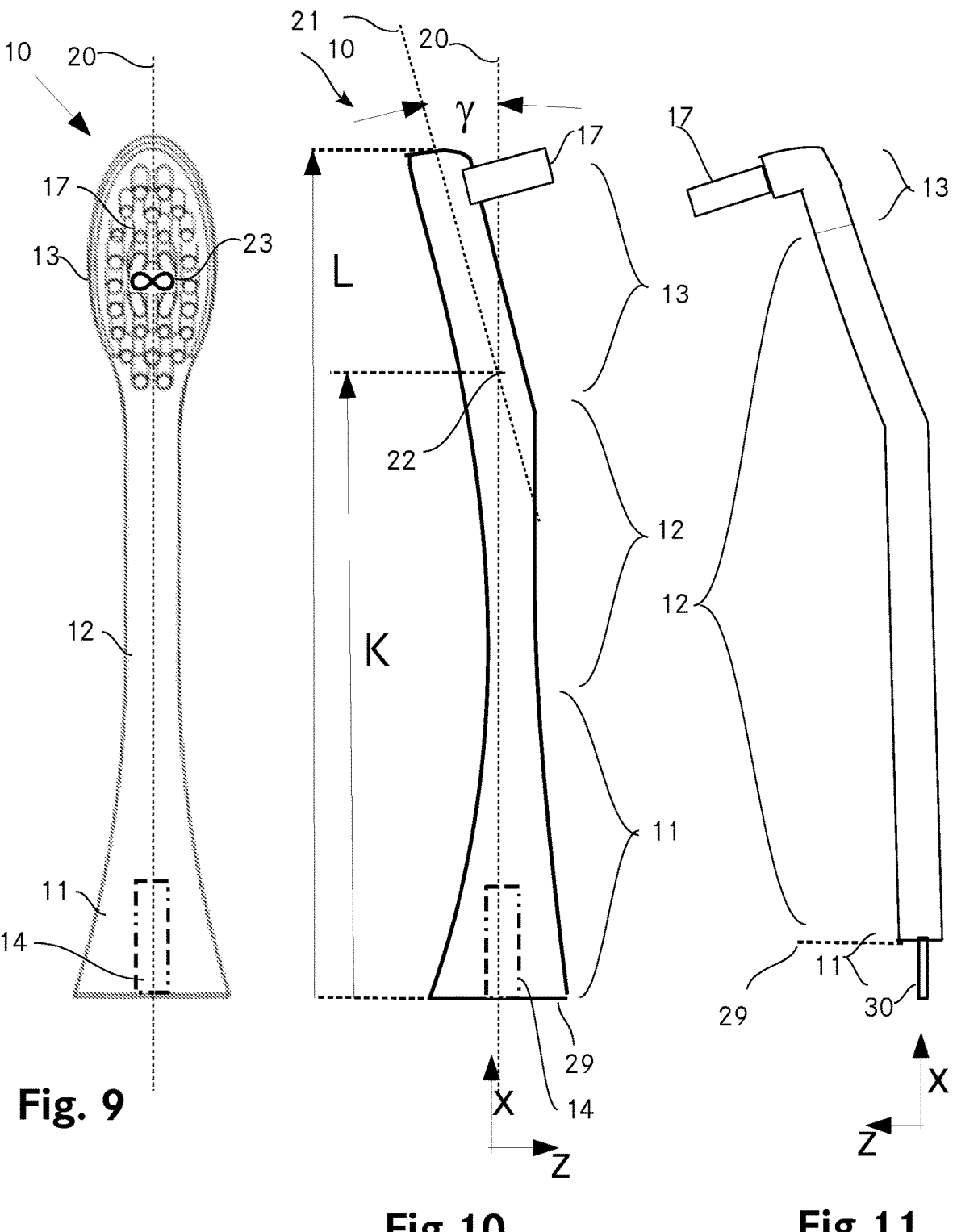
FIG. 9 depicts an embodiment with an oval brush head.
FIG. 10 depicts an embodiment of a single tuft brush with a rear bristle field.
FIG. 11 depicts an embodiment of a single tuft brush with a front bristle field.

FIG. 9 shows a brush 10 with a plate-shaped oval head portion 13. The longitudinal axis of the oval shape is substantially in the x-direction and the transverse axis is in the y-direction. The center of the head portion 13 is here further away from the upper end of the brush 10 than in the drop-shaped head portion according to FIG. 1.

FIG. 10 shows a brush with a kink angle γ (gamma) of 14° and a distance K of the geometric kink position 22 to the end face 29 of the base portion 11 of 75% relative to the length L of the brush.

The base portion 11 tapers from the end surface 29 to the transition into the neck portion 12. The base portion 11 may be, for example, frustoconical or frustopyramidal, having in longitudinal section a profile that is, for example, concave. Thus, the center of gravity of the base portion 11 is closer to the end surface 29 than in a comparable base portion with straight profile lines.

The neck portion 12 occupies approximately half the length (L) of the brush in the illustrated embodiment. As FIG. 10 illustrates, the neck portion 12 need not necessarily have a constant cross-section along its entire length. It may well have a varying contour.

The head portion 13 is formed by the extension of the neck portion 12. In the present example, the head portion 13 has substantially the same transverse dimensions (as viewed in a section perpendicular to the head portion alignment axis 21) as the neck portion 12. The bristle array 17 is placed laterally on the head portion 13. The bristles thus protrude perpendicular to the head portion alignment axis 21.

FIG. 11 shows an embodiment in which the base portion 11 is essentially formed by a pin 30 as a drive adapter. The neck portion 12 is rod-shaped and occupies e.g. 90% of the brush length. The head portion 13 is the portion in which the bristle field 17 is anchored, here in the form of a single tuft. The pin 30 is inserted into the hand apparatus in the x-direction for rotation-fixed coupling to a sonic tooth brush drive with longitudinal axis vibration, the drive adapter defining the geometric base portion longitudinal axis (x) of the brush.

A brush according to FIG. 11, for example, is made of a material with a Young's modulus of about 4600 MPa. An example of such a material is LNP ULTEM® EXCP0096 Polyetherimide, 30% Carbon Fiber Reinforcement, 10% PTFE Lubricant (Tensile Strength at Yeald=163 MPa, Elongation at Yield=3.5%, Tensil Strength/Elongation=4650 MPa).

Figures 12A, 12B, 12C:
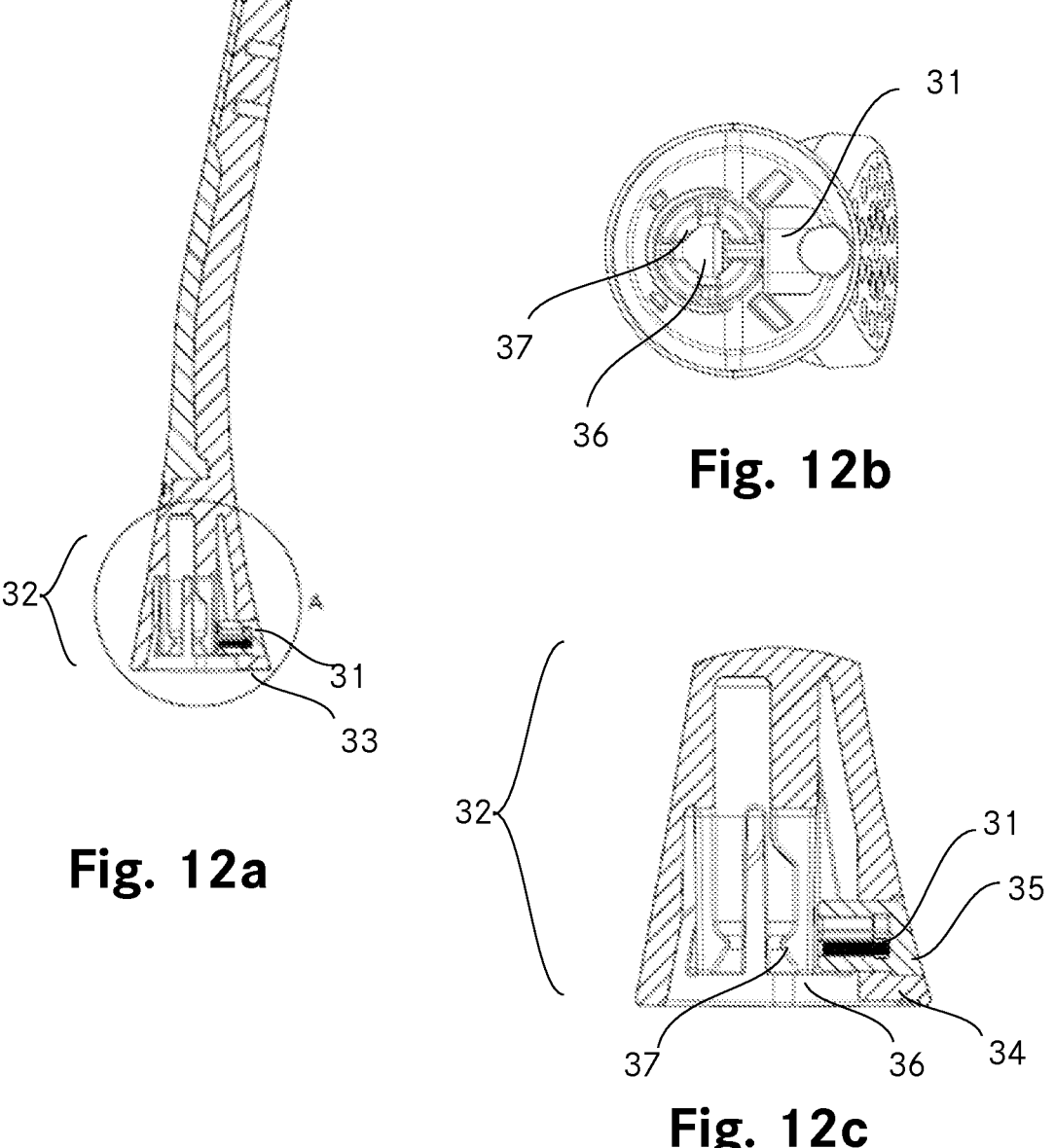
FIGS. 12*a-c* depict an embodiment with an RFID.

FIGS. 12*a-c* show an embodiment with an RFID chip 31. FIG. 12*a* shows a longitudinal section of the brush, FIG. 12*b* a view from below of the adapter plane 33 of the brush, and FIG. 12*c* shows an enlarged section of FIG. 12*a*. The RFID chip 31 is housed in the conical base portion 32, preferably close above the adapter plane 33 (which corresponds to the end face 29 in the previous embodiments). In the present case, only a base plate 34 is provided as protection between the adapter plane 33 and the RFID chip 31. The RFID chip 31 can, for example, be fixed in a holder 35, which in turn is inserted in the manner of a plug into an opening of the base portion 32 and is anchored there.

The coupling cavity 36 for the drive pin (not shown) of the hand apparatus opens out at the adapter plane 33. Clamping elements 37 are located in the coupling cavity 36, which clamp the drive pin of the hand apparatus (releasable) in such a way that the vibration movement of the drive pin is transmitted to the brush in the best possible way. The coupling cavity 36 with the clamping elements 37 is an example of a plug-in connection between the brush and a drive pin of the hand apparatus.

The RFID chip 31 is located in the longitudinal region occupied by the coupling cavity 36. Advantageously, the longitudinal portion of the coupling cavity is substantially the same length as that of the tapered base portion of the brush.

In FIGS. 12*a-c*, an embodiment is shown in which the RFID chip holder is inserted laterally (i.e., transversely to the longitudinal axis of the brush). However, it is also possible to design the brush so that the holder is inserted from the adapter plane.

The hand apparatus houses an RFID reader (not shown) that can read the RFID chip 31. This makes it possible, for example, to control the drive at the optimal frequency for the brush so that the controlled two-dimensional movement according to the invention is optimally generated. Other data can also be read out, which indicate to the user via acoustic or optical signals whether the brush is to be changed.

In further embodiments not shown, the brush 10 comprises an interdental brush for cleaning the interdental spaces instead of the bristle field 17.

In summary, according to the invention, a brush for a sonic toothbrush drive is created which leads to a particularly advantageous movement of the head portion for an effective gum-sparing cleaning of the teeth.

The invention claimed is:

1. A brush for a sonic toothbrush with longitudinal axis vibration comprising an elongated base body, comprising
    a) a frustoconical base portion having a drive adapter for rotation-fixed coupling to a sonic tooth brush drive with longitudinal axis vibration, said drive adapter defining a geometric base portion longitudinal axis of the brush,
    b) a head portion with a head portion alignment axis and a bristle support in which a plurality of bristles are anchored, and
    c) a neck portion with a reduced cross-section as compared to the base portion, the neck portion connecting the base portion and the head portion, and
    d) wherein the elongated base body forms a kink angle such that the geometric base portion longitudinal axis and the head portion alignment axis include an angle $\gamma$ in the range of 5° to 12°, and
    e) wherein a geometric kink position in the elongated base portion body has a distance to an end face of the base portion of at least 50% of a total length of the base body.

2. The brush according to claim 1, wherein the distance of the geometric kink position to the end face of the base portion is at least 60% of the total length of the base body.

3. The brush according to claim 1, wherein the distance of the geometric kink position to the end face of the base portion is at most 75% of the total length of the base body.

4. The brush according to claim 1, wherein the head portion is plate-shaped and the neck portion is rod-shaped, wherein at least one of
    a) the head portion is at least about twice as wide as the neck portion,
    b) the head portion is at most about 1.5 times as long as the neck portion, and
    c) the head portion is approximately the same thickness as the neck portion in a cross-section spanned by the longitudinal axis and the head alignment axis.

5. The brush according to claim 1, wherein the head portion has a mass which is greater than a mass of the neck portion.

6. The brush according to claim 1, wherein the base body comprises a load-bearing material having a Young's modulus of not more than 6000 MPa and not less than 2000 MPa.

7. The brush according to claim 1, wherein the base body comprises
    one piece of one material or
    wherein the base body is essentially formed by two or by three parts of material which are joined by material bonding.

8. A sonic toothbrush with longitudinal axis vibration, comprising
    a) a brush according to claim 7; and
    b) a hand apparatus having a brush coupling for releasably attaching the brush to the hand apparatus and having a drive in the hand apparatus which produces a longitudinal axis vibration at the brush coupling.

9. The sonic toothbrush according to claim 8, wherein:
    the drive in the hand apparatus is configured to generate a longitudinal axis vibration frequency in the range of 150 Hz to 400 Hz,
    and
    the drive is designed to generate a longitudinal axis vibration with an amplitude of at most 3°.

10. The brush according to claim 1, wherein the head portion has a deflection of 10%-20% with respect to a length of the brush.

11. The brush according to claim 1, wherein the geometric base portion longitudinal axis and the geometric head portion alignment axis include the angle γ in the range of 7° to 10°.

12. The brush according to claim 1, further comprising an RFID chip in the base portion.

13. The brush according to claim 12, wherein the RFID chip is arranged in a longitudinal region of a coupling cavity of the base portion.

14. A brush for a sonic toothbrush with longitudinal axis vibration having an elongated base body, the brush comprising:

a) a base portion having a drive adapter for rotation-fixed coupling to a sonic tooth brush drive with longitudinal axis vibration, said drive adapter defining a geometric base portion longitudinal axis of the brush, b) a head portion having a head portion alignment axis and having a bristle support in which a plurality of bristles are anchored, c) a neck portion with a reduced cross-section as compared to the base portion, connecting the base portion and the head portion, whereby d) the base body forms a kink angle such that the geometric base portion longitudinal axis and the head portion alignment axis include an angle γ in the range of 8° to 15°, and e) the base body comprises a load-bearing material with a Young's modulus of not more than 6000 MPa and not less than 2000 MPa.

15. The brush according to claim 14, wherein the Young's modulus is at least 2500 MPa.

16. The brush according to claim 14, wherein the head portion is plate-shaped and the neck portion is rod-shaped, and wherein at least one of:

a) the head portion is at least about twice as wide as the neck portion;

b) the head portion is at most about 1.5 times as long as the neck portion; and c) the head portion is approximately the same thickness as the neck portion in a cross-section spanned by the longitudinal axis and the head alignment axis.

17. The brush according to claim 14, whereby the head portion has a mass which is greater than a mass of the neck portion.

18. The brush according to claim 14, wherein:

the base body comprises essentially one piece of a load-bearing material, or the base body is essentially formed by two or by three parts of material which are joined by material bonding.

19. The brush according to claim 14, wherein the distance of a geometric kink position from an end face of the base portion is at least 50% of a length of the base body.

20. The brush according to claim 14, wherein the distance of a geometric kink position from an end face of the base portion is at most 75% of the total length of the base body.

\* \* \* \* \*